(12) United States Patent
Ishihara et al.

(10) Patent No.: US 6,800,107 B2
(45) Date of Patent: Oct. 5, 2004

(54) EXHAUST GAS PURIFYING FILTER

(75) Inventors: Mikio Ishihara, Kariya (JP); Mamoru Nishimura, Nagoya (JP); Makoto Saito, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/123,207

(22) Filed: Apr. 17, 2002

(65) Prior Publication Data

US 2002/0189217 A1 Dec. 19, 2002

(30) Foreign Application Priority Data

Apr. 19, 2001 (JP) .......................................... 2001-121441
Mar. 7, 2002 (JP) .......................................... 2002-062133

(51) Int. Cl.[7] .............................................. B01D 46/00
(52) U.S. Cl. ...................... 55/523; 55/282.3; 55/385.3; 55/524; 55/DIG. 30; 60/311
(58) Field of Search ................................ 55/523, 385.3, 55/DIG. 30, 524, DIG. 10, 282.3; 60/311

(56) References Cited

U.S. PATENT DOCUMENTS

| 4,416,675 A | * 11/1983 | Montierth .................... 55/523 |
| 4,509,966 A | 4/1985 | Dimick et al. |
| 4,718,926 A | 1/1988 | Nakamoto et al. |
| 5,198,007 A | 3/1993 | Moyer et al. |
| 5,595,581 A | * 1/1997 | Ichikawa et al. ............. 55/523 |
| 6,541,407 B2 | * 4/2003 | Beall et al. ................... 55/523 |

FOREIGN PATENT DOCUMENTS

| EP | 0992272 A1 | 4/2000 |
| JP | 61-136412 | 6/1986 |
| JP | 6-327921 | 11/1994 |
| JP | 9-155131 | 6/1997 |

* cited by examiner

*Primary Examiner*—Duane Smith
*Assistant Examiner*—Jason M. Greene
(74) *Attorney, Agent, or Firm*—Nixon & Vanderhye P.C.

(57) ABSTRACT

An exhaust gas purifying filter employs plugs that can be used as part of filter. The exhaust gas purifying filter has a honeycomb structure including a multitude of cells each surrounded by walls. Each of the cells is stopped with a plug on one end and the walls and the plugs are all made of a porous material. The value of $M=(L/t)\times(P1/P2)$ is in a range of $10<M<90$, where P1 is the porosity of the walls, P 2 is the porosity of plugs, t is mean thickness of the walls and L is mean length of the plugs.

8 Claims, 2 Drawing Sheets

EXHAUST GAS PURIFYING FILTER

BACKGROUND OF THE INVENTION

1. Field of the Invention

The present invention relates to an exhaust gas purifying filter that is made of a ceramic material and is used for collecting particulate matter, such as fine carbon particles, emitted from internal combustion engines.

2. Description of the Related Art

Use of a honeycomb structure made of ceramic material is viewed as promising as an exhaust gas purifying filter that collects, and then burns, the particulate matter, such as fine carbon particles, that are emitted by a diesel engine or the like, so as to be regenerated.

Specifically, as shown in FIG. 3, an exhaust gas purifying filter 9 of the prior art has cells 90 of a honeycomb structure of which is alternately stopped with a plug 95. On each end of the honeycomb structure, the plugs 95 are arranged in a checkerboard pattern. Walls 98 are provided with a catalyst supported thereon.

With this constitution, as shown in FIG. 3, exhaust gas 8 that has entered the cells 90 is discharged after passing through the walls 98, while the particulate matter included in the exhaust gas 8 is captured in the walls 98 so as to accumulate therein. The particulate matter that has accumulated is burned and removed by the action of the catalyst supported on the walls 98, so that the exhaust gas purifying filter 9 is occasionally rejuvenated.

In order to further improve the purification performance of the exhaust gas purifying filter 9, it is effective to increase the inner surface area of the filter. This has been achieved by various methods such as decreasing the thickness of the walls of the honeycomb structure, that constitutes the exhaust gas purifying filter, and decreasing the pitch of the cells, among others. However, although the methods based on decreasing the thickness of the walls are effective, there is a limitation as the methods make it difficult to manufacture, and decrease the strength of, the structure.

As other means to increase the filtering area than decreasing the thickness of the walls, it is considered to be effective to use the plugs 95 as part of the filter.

SUMMARY OF THE INVENTION

In consideration of the problems of the prior art described above, the present invention has an object to provide an exhaust gas purifying filter that can utilize the plugs as part of the filter.

A first aspect of the invention is an exhaust gas purifying filter made as a honeycomb structure comprising a multitude of cells each surrounded by walls, each of the cells being stopped with a plug on one end thereof.

The walls and the plugs of the exhaust gas purifying filter are all made of a porous material, and the value of $M=(L/t)\times(P1/P2)$ is in a range of $10<M<90$, where P1 is the porosity of the walls, P2 is the porosity of the plugs, t is mean thickness of the walls and L is mean length of the plugs.

In the exhaust gas purifying filter of the present invention, the walls and the plugs are all made of the porous material, with the porosity and the size thereof satisfying the particular relationship.

That is, the value of M calculated as $(L/t)\times(P1/P2)$ is in a range of $10<M<90$, where P1 is the porosity of the walls, P2 is the porosity of the plugs, t is mean thickness of the walls and L is mean length of the plugs. Accordingly, the exhaust gas purifying filter can be made in such a way that the exhaust gas can pass through the plugs while maintaining sufficient strength of the plugs. As a result, the plugs can be used as part of the filter without decreasing the strength of the plugs, so that the entire filtering area can be increased and the performance of the exhaust gas purifying filter as a whole can be improved.

Mean values are used for t and L according to the present invention. The value of porosity can be given by measuring the volume of the pores, by a mercury injection method, using a porosimeter. Since the mean values are used for t and L, it is not necessary for all the plugs to satisfy the requirements described above. It suffices that at least the mean values provide for the particular range of the value of M.

A second aspect of the invention is an exhaust gas purifying filter made in honeycomb structure comprising a multitude of cells each surrounded by walls, each of the cells being stopped with a plug on either end thereof.

The walls and the plugs of the exhaust gas purifying filter are all made of a porous material, wherein at least 50% of the plugs have values of $M2=(L2/t)\times(P1/P2)$ in a range of $10<M2<90$, where P1 is the porosity of the walls, P2 is the porosity of the plugs, t is the mean thickness of the walls and L2 is the length of each plug.

In the exhaust gas purifying filter of the present invention, at least 50% of the plugs have values of M2, calculated from the values of P2 and L2 of each of the plugs, the porosity P1 of the walls and the mean thickness t of the walls, that fall within the particular range described above. This constitution can also improve the purifying performance by utilizing the plugs as part of the filter.

DESCRIPTION OF THE PREFERRED EMBODIMENTS

In case the value of M is less than 10 in the first aspect of the invention, the strength of the plugs is too low to be practically useful. When the value of M is more than 90, on the other hand, it becomes difficult for the exhaust gas to pass through the plugs and to use the plugs as part of the filter.

The value of M is preferably 25 or less. When this is the case, the effect of using the plugs as part of the filter can be fully achieved.

When the proportion of the plugs that have values of M2 in a range of $10<M2<90$ is less than 50%, substantial filtering effect of the plugs cannot be achieved, according to the second aspect of the invention.

It is preferable that 50% or more of the plugs have M2 of values not larger than 25. When this is the case, the effect of the plugs to serve as part of the filter can be further improved.

In the first and second aspects of the invention, the mean length of the plugs is preferably 5 mm or less. Plugs of which the mean length is larger than 5 mm present a large resistance against the flow of the exhaust gas passing therethrough, which may decrease the filtering function. Thus the mean length is more preferably 3 mm or less. When the length is too small, the strength of the plugs becomes insufficient. Thus the mean length of the plugs has a lower limit of preferably 0.5 mm.

The walls and the plugs of the exhaust gas purifying filter may be made of a ceramic material such as cordierite, mullite, spinel or the like.

The walls and the plugs can be provided with a catalyst supported thereon for burning the particulate matter that has been captured. The catalyst may be, for example, a three-way catalyst, a PM oxidizing catalyst and a NOx occlusion reduction catalyst.

EXAMPLE 1

The example of the exhaust gas purifying filter of the invention will now be described below with reference to FIG. 1 and FIG. 2.

Figure 1:
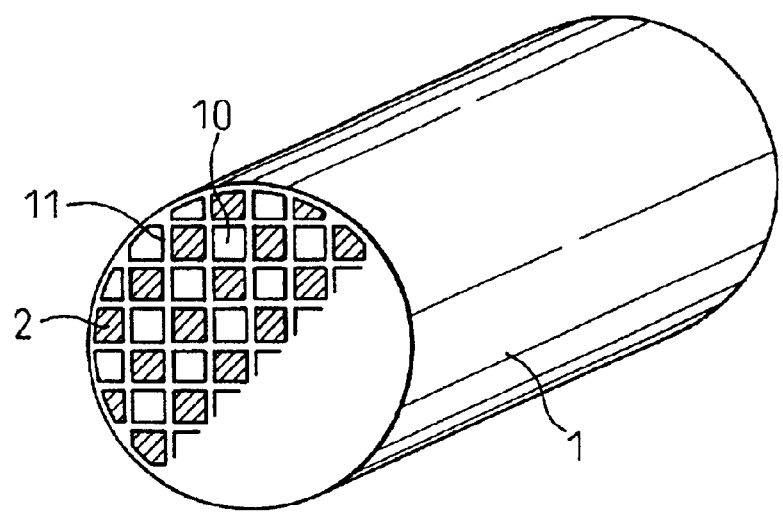
FIG. 1 is a perspective view of the exhaust gas purifying filter of Example 1 of the invention.
Figure 2:
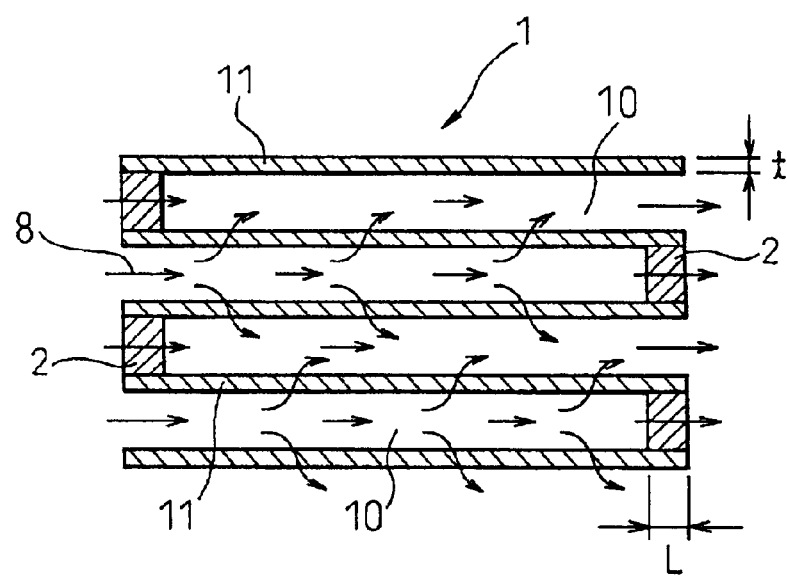
FIG. 2 shows the sectional structure of the exhaust gas purifying filter of Example 1.
Figure 3:
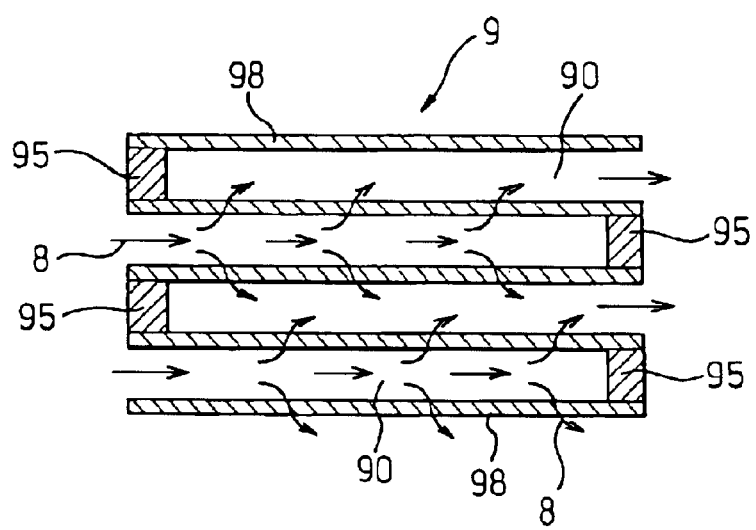
FIG. 3 shows the sectional structure of the exhaust gas purifying filter of the prior art.

The exhaust gas purifying filter 1 of this example is made in honeycomb structure comprising a multitude of cells 10 each surrounded by walls, with each of the cells 10 being stopped with a plug on one end thereof, as shown in FIG. 1 and FIG. 2.

The walls 11 and the plugs 2 are all made of a porous material. Value of $M=(L/t)\times(P1/P2)$ is in a range of $10<M<90$, where P1 is the porosity of the walls 11, P2 is the porosity of the plugs 2, t is mean thickness of the walls 11 and L is mean length of the plugs 2.

Now the constitution will be described in more detail below.

The exhaust gas purifying filter 1 of this example is manufactured by first fabricating the honeycomb structure from a ceramic material. For this purpose, a cordierite material is prepared as the raw material. The cordierite material includes kaolin, aluminum hydroxide, alumina, talc, carbon powder and other components. Proportions of the components are adjusted so as to achieve the final composition of cordierite that includes $SiO_2$ in a range from 45 to 55% by weight, $Al_2O_3$ from 33 to 42% by weight and MgO from 12 to 18% by weight. Porosity is controlled by adjusting the contents of components such as carbon powder, kaolin, talc and aluminum hydroxide.

After mixing predetermined quantities of the cordierite material and water, the mixture is formed into honeycomb structure by extrusion molding using a die. Then the cordierite material is placed at the end of selected cells so as to form the plugs 2. In this example, the plugs 2 were arranged in checkerwork pattern. The honeycomb structure is then dried and fired.

The plugs 2 can be attached by employing various known methods.

The honeycomb structure (the exhaust gas purifying filter 1) thus obtained has 300 cells and the walls 11 are 0.2 mm in thickness. In this example, porosity P1 of the walls 11 is 55%, porosity P2 of the plugs 2 is 70%, mean thickness t of the walls 11 is 0.2 mm and mean length L of the plugs 2 is 4 mm. Thus the value of M is 16.

The exhaust gas purifying filter 1 is provided with a PM oxidizing catalyst for burning the particulate matter supported on the entire surface, namely on the surface of the walls 11 and on the surface of the plugs 2, thereby to complete the exhaust gas purifying filter.

The exhaust gas purifying filter 1 is incorporated in a catalyst converter that is not shown, and is used as a particulate filter for diesel engines.

Now the operation and effect of this example will be described below.

In the exhaust gas purifying filter 1 of this example, the walls 11 and the plugs 2 were all made of the porous material. Porosity and sizes of these members were selected so as to make the value of M 16. This allows the exhaust gas purifying filter 1 to use the plugs 2 as part of the filter when installed in the flow passage of exhaust gas.

Specifically, the exhaust gas 8 that is introduced into the cells 10 of the exhaust gas purifying filter 1 is divided into a part that passes through the wall 11 into the adjacent cell before being discharged, and a part that passes through the plug 2 and is discharged. The particulate matter included in the exhaust gas 8 is captured by the plugs 2 as well as by the walls 11. The particulate matter that has been captured is burned and removed by the action of the catalyst supported on the walls 11 and on the plugs 2.

Thus the exhaust gas purifying filter 1 of this example has a filtering area that is the sum of the surface area of the walls 11 and the surface area of the plugs 2, and is larger than that achieved with the prior art. As a result, the exhaust gas purifying filter 1 has purifying performance higher than that of the prior art.

The strength of the plugs 2 can also be maintained high enough for practical use, as the value of M is more than 10.

EXAMPLE 2

In this example, a plurality of honeycomb structures similar to the exhaust gas purifying filter 1 of Example 1 were fabricated and subjected to experiments to determine the effect of the value of M while changing the porosity, size and other factors. In this example, the honeycomb structures were fabricated similarly to Example 1.

Values of P1, P2, t and L of the honeycomb structures that were fabricated are shown in Table 1 and Table 2.

As shown in the tables, 51 kinds of honeycomb structure were fabricated in this example, having the porosity P1 of the walls 11 in a range from 55 to 70%, the mean thickness of the walls 11 being 0.2 mm or 0.3 mm, the porosity P2 of the plugs 2 in a range from 10 to 70% and the mean length L of the plugs 2 in a range from 2 to 6 mm.

Table 1 and Table 2 show the values of M calculated by the equation $M=(L/t)\times(P1/P2)$.

In this example, an experiment was conducted to capture 2 g/liter of particulate-like soot generated by a soot generator. After the experiment, a cross section of the plug 2 located downstream was observed with an electron microscope, to see whether the soot infiltrated inside of the plug. The results are shown in Table 1 and Table 2, where ⊙ indicates sufficient infiltration of soot, ○ indicates some infiltration with an extent lower than the case of ⊙, Δ indicates slight infiltration and X indicates no infiltration at all.

As can be seen from Table 1 and Table 2, all samples having value of M higher than 90 showed the result of X in the soot infiltration experiment, showing no filtering effect. Samples having M less than 90 showed the result of ⊙, ○ or Δ, showing some filtering effect. Among these, those having M of 25 or less showed sufficient infiltration of soot, indicating a high filtering effect.

When the value of M is less than 10, which means short length L of the plugs 2 and high porosity P2, the strength of the plug 2 is too low to be practically useful, although this was not shown by the experiment.

TABLE 1

| Sample No. | Wall Porosity P1 (%) | Wall Thickness t (mm) | Plug Porosity P2 (%) | Plug Length L (mm) | M | Infiltration of soot ⊚: Sufficient infiltration ○: Some infiltration Δ: Slight infiltration X: No infiltration. |
| --- | --- | --- | --- | --- | --- | --- |
| 1 | 55 | 0.2 | 10 | 2 | 55 | ○ |
| 2 | 55 | 0.2 | 10 | 4 | 110 | X |
| 3 | 55 | 0.2 | 10 | 6 | 165 | X |
| 4 | 55 | 0.2 | 35 | 2 | 16 | ⊚ |
| 5 | 55 | 0.2 | 35 | 4 | 31 | ○ |
| 6 | 55 | 0.2 | 35 | 6 | 48 | ○ |
| 7 | 55 | 0.2 | 70 | 2 | 8 | ⊚ |
| 8 | 55 | 0.2 | 70 | 4 | 16 | ⊚ |
| 9 | 55 | 0.2 | 70 | 6 | 24 | ⊚ |
| 10 | 55 | 0.3 | 35 | 2 | 10 | ⊚ |
| 11 | 55 | 0.3 | 35 | 4 | 21 | ⊚ |
| 12 | 55 | 0.3 | 35 | 6 | 31 | ○ |
| 13 | 55 | 0.3 | 70 | 2 | 5 | ⊚ |
| 14 | 55 | 0.3 | 70 | 4 | 10 | ⊚ |
| 15 | 55 | 0.3 | 70 | 6 | 16 | ⊚ |
| 16 | 60 | 0.2 | 10 | 2 | 60 | ○ |
| 17 | 60 | 0.2 | 10 | 4 | 120 | X |
| 18 | 60 | 0.2 | 10 | 6 | 180 | X |
| 19 | 60 | 0.2 | 35 | 2 | 17 | ⊚ |
| 20 | 60 | 0.2 | 35 | 4 | 34 | ○ |
| 21 | 60 | 0.2 | 35 | 6 | 51 | ○ |
| 22 | 60 | 0.2 | 70 | 2 | 9 | ⊚ |
| 23 | 60 | 0.2 | 70 | 4 | 17 | ⊚ |
| 24 | 60 | 0.2 | 70 | 6 | 26 | ○ |
| 25 | 60 | 0.3 | 10 | 2 | 40 | ○ |
| 26 | 60 | 0.3 | 10 | 4 | 80 | ○ |
| 27 | 60 | 0.3 | 10 | 6 | 120 | X |
| 28 | 60 | 0.3 | 35 | 2 | 11 | ⊚ |
| 29 | 60 | 0.3 | 35 | 4 | 23 | ⊚ |
| 30 | 60 | 0.3 | 35 | 6 | 34 | ○ |
| 31 | 60 | 0.3 | 70 | 2 | 6 | ⊚ |
| 32 | 60 | 0.3 | 70 | 4 | 11 | ⊚ |
| 33 | 60 | 0.3 | 70 | 6 | 17 | ⊚ |

TABLE 2

| Sample No. | Wall Porosity P1 (%) | Wall Thickness t (mm) | Plug Porosity P2 (%) | Plug Length L (mm) | M | Infiltration of soot ⊚: Sufficient infiltration ○: Some infiltration Δ: Slight infiltration X: No infiltration. |
| --- | --- | --- | --- | --- | --- | --- |
| 34 | 70 | 0.2 | 10 | 2 | 70 | ○ |
| 35 | 70 | 0.2 | 10 | 4 | 140 | X |
| 36 | 70 | 0.2 | 10 | 6 | 210 | X |
| 37 | 70 | 0.2 | 35 | 2 | 20 | ⊚ |
| 38 | 70 | 0.2 | 35 | 4 | 40 | ○ |
| 39 | 70 | 0.2 | 35 | 6 | 60 | ○ |
| 40 | 70 | 0.2 | 70 | 2 | 10 | ⊚ |
| 41 | 70 | 0.2 | 70 | 4 | 20 | ⊚ |
| 42 | 70 | 0.2 | 70 | 6 | 30 | ○ |
| 43 | 70 | 0.3 | 10 | 2 | 47 | ○ |
| 44 | 70 | 0.3 | 10 | 4 | 93 | Δ |
| 45 | 70 | 0.3 | 10 | 6 | 140 | X |
| 46 | 70 | 0.3 | 35 | 2 | 13 | ⊚ |
| 47 | 70 | 0.3 | 35 | 4 | 27 | ○ |
| 48 | 70 | 0.3 | 35 | 6 | 40 | ○ |
| 49 | 70 | 0.3 | 70 | 2 | 7 | ⊚ |
| 50 | 70 | 0.3 | 70 | 4 | 13 | ⊚ |
| 51 | 70 | 0.3 | 70 | 6 | 20 | ⊚ |

What is claimed is:

1. An exhaust gas purifying filter comprising:

a honeycomb structure having a multitude of cells each surrounded by walls and stopped with a plug on one end thereof, wherein said walls and said plugs are substantially all made of a porous material and the value of $M=(L/t) \times (P1/P2)$ is in a range of $10<M<90$, where P1 is the porosity of said walls, P2 is the porosity of said plugs, t is mean thickness of said walls and L is mean length of said plugs.

2. An exhaust gas purifying filter as in claim 1, wherein the value of M is $10<M<25$.

3. An exhaust gas purifying filter as in claim 1, wherein the mean length of said plugs is 5 mm or less.

4. An exhaust gas purifying filter comprising:

a honeycomb structure having a multitude of cells each surrounded by walls and stopped with a plug on one end thereof, wherein said walls and said plugs are substantially all made of a porous material, and at least 50% of said plugs have values of $M2=(L2/t) \times (P1/P2)$ in a range of $10<M2<90$, where P1 is the porosity of said walls, P2 is the porosity of said plugs, t is mean thickness of said walls and L2 is the length of each of said plugs.

5. An exhaust gas purifying filter as in claim 4, wherein 50% or more of said plugs have the value of M2 $10<M2<25$.

6. An exhaust gas purifying filter as in claim 4, wherein the mean length of said plugs is 5 mm or less.

7. An exhaust gas purifying filter comprising:

a honeycomb structure comprising a multitude of cells each surrounded by walls, each of said cells being stopped by a plug on one end thereof, wherein said walls and said plugs are substantially all made of porous material, said walls and said plugs being provided with a catalyst supported thereon for burning the particulate matter that has been captured, at least 50% of the plugs having values of $M2=(L2/t) \times (P1/P2)$ in a range of $13<M2<90$, where P1 is the porosity of said walls, P2 is the porosity of said plugs, t is mean thickness of said walls and L2 is the length of each of said plugs, and the mean length of said plugs being 5 mm or less.

8. An exhaust gas purifying filter as in claim 1, wherein all plugs have a value M2 in a range of $13<M2<90$.

* * * * *